United States Patent
Bagepalli et al.

(10) Patent No.: US 6,315,519 B1
(45) Date of Patent: Nov. 13, 2001

(54) TURBINE INNER SHROUD AND TURBINE ASSEMBLY CONTAINING SUCH INNER SHROUD

(75) Inventors: Bharat Sampathkumaran Bagepalli, Niskayuna; Gregory Scot Corman, Ballston Lake; Anthony John Dean, Scotia; Paul Stephen DiMascio, Clifton Park; Massoud Mirdamadi, Niskayuna, all of NY (US)

(73) Assignee: General Electric Company, Schenectady, NY (US)

(*) Notice: Subject to any disclaimer, the term of this patent is extended or adjusted under 35 U.S.C. 154(b) by 0 days.

(21) Appl. No.: 09/300,692

(22) Filed: Apr. 27, 1999

Related U.S. Application Data
(60) Provisional application No. 60/102,194, filed on Sep. 28, 1998.

(51) Int. Cl.[7] .................... F01D 11/08; F01D 11/18
(52) U.S. Cl. .............. 415/135; 415/136; 415/138; 415/139; 415/173.3; 415/200
(58) Field of Search ...................... 415/135, 136, 415/138, 139, 173.1, 173.6, 200, 173.3, 174.2

(56) References Cited

U.S. PATENT DOCUMENTS

| | | | |
|---|---|---|---|
| 4,355,952 | * 10/1982 | Brown et al. ............... | 415/115 |
| 4,529,355 | * 7/1985 | Wilkinson ................. | 415/173.3 |
| 5,062,767 | 11/1991 | Worley et al. . | |
| 5,080,557 | * 1/1992 | Berger ..................... | 415/173.3 |
| 5,228,828 | 7/1993 | Damlis et al. ............. | 415/173.2 |
| 5,423,659 | 6/1995 | Thompson . | |
| 5,738,490 | * 4/1998 | Pizzi ....................... | 415/173.1 |
| 5,780,146 | * 7/1998 | Mason et al. ............... | 428/328 |

FOREIGN PATENT DOCUMENTS

| | | | |
|---|---|---|---|
| 8100481 | 4/1981 | (EP) . | |
| 1220904 | 10/1969 | (GB) . | |
| 1406098 | 9/1975 | (GB) . | |
| 2081817 | 8/1980 | (GB) . | |
| 2168110 | 6/1986 | (GB) . | |
| 2240818 | 8/1991 | (GB) . | |
| 2249356 | 5/1992 | (GB) . | |
| 61-152906 | * 7/1986 | (JP) ........................ | 415/173.3 |

OTHER PUBLICATIONS

Concurrently filed patent application by Bharat S. Bagepalli et al., entitled "Turbine Assembly Containing an Inner Shroud," (RD–27,001).

\* cited by examiner

Primary Examiner—Christopher Verdier
(74) Attorney, Agent, or Firm—Donald S. Ingraham; Christian Cabou

(57) ABSTRACT

A turbine inner shroud and a turbine assembly. The turbine assembly includes a turbine stator having a longitudinal axis and having an outer shroud block with opposing and longitudinally outward facing first and second sides having open slots. A ceramic inner shroud has longitudinally inward facing hook portions which can longitudinally and radially surround a portion of the sides of the outer shroud block. In one attachment, the hook portions are engageable with, and are positioned within, the open slots.

8 Claims, 3 Drawing Sheets

TURBINE INNER SHROUD AND TURBINE ASSEMBLY CONTAINING SUCH INNER SHROUD

This application claims priority of a Provisional Application entitled "Inner Shroud Attachment Design For Ceramic Components Using A Seal Insert In The Outer Shroud" by Bharat S. Bagepalli, et al., Ser. No. 60/102,194 filed Sept. 28, 1998.

The U.S. Government may have certain rights in this invention pursuant to contract number DEFC02-92-CE41000 awarded by the U.S. Department of Energy.

BACKGROUND OF THE INVENTION

The present invention relates generally to turbines, and more particularly to a turbine inner shroud and a turbine assembly containing an inner shroud.

Turbine assemblies include, without limitation, turbine sections of steam turbines and compressor and/or turbine sections of gas turbines. Steam and gas turbines are used, among other purposes, to power electric generators, and gas turbines also are used, among other purposes, to propel aircraft and ships. A steam turbine has a steam path which typically includes, in serial-flow relationship, a steam inlet, a turbine, and a steam outlet. A gas turbine has a gas path which typically includes, in serial-flow relationship, an air intake (or inlet), a compressor, a combustor, a turbine, and a gas outlet (or exhaust nozzle). Compressor and turbine sections include at least one circumferential row of rotating blades. The free ends or tips of the rotating blades are surrounded by a stator casing. The radial gap between the blade tips and the stator casing is made small for increased efficiency of the turbine.

Typically, as shown in prior-art FIG. 1, a metal inner shroud 2 (such as one made of Inconel®), has been attached through mating slots to a circumferential segment of an outer shroud block 4 of the stator casing 6 and is spaced apart from the blade tips 8. The metal inner shroud 2 is subject to heat distortion because of high thermal gradients in the shroud area of the turbine. Such heat distortion places the inner shroud 2 and the outer shroud block 4 under significant mechanical stresses. What is needed is an inner shroud which is more heat resistant and an attachment for the inner shroud which is subject to less mechanical stress.

BRIEF SUMMARY OF THE INVENTION

Broadly described, an exemplary turbine inner shroud of the present invention is attachable to a circumferential segment of an outer shroud block of a stator of a turbine. The stator has a longitudinal axis. The shroud-block circumferential segment has longitudinally spaced apart, generally opposing, and generally longitudinally outward facing first and second side portions. The inner shroud includes a ceramic material and has spaced apart, generally opposing, and generally inward facing first and second hook portion. When the inner shroud is attached to the shroud-block circumferential segment, the first hook portion longitudinally and radially surrounds the first side portion, and the second hook portion longitudinally and radially surrounds the second side portion.

Broadly described, an exemplary turbine assembly of the present invention has a turbine stator and a ceramic inner shroud. The stator has a longitudinal axis and an outer shroud block. The outer shroud block has a circumferential segment, wherein the circumferential segment has longitudinally spaced apart, generally opposing, and generally longitudinally outward facing first and second sides. The first side has a generally longitudinally outward facing first open slot. The ceramic inner shroud includes a first hook portion having a first end positioned in the first open slot.

Several benefits and advantages are derived from the invention. The ceramic inner shroud is heat resistant. The inward-facing first and second hook portions of the exemplary ceramic inner shroud are easy to manufacture and, when the ceramic is a ceramic matrix composite, provide continuous reinforcing fibers from the hook region to the hot gas path face which is desirable to maintain structural integrity and dimensional stability of the ceramic inner shroud. In the exemplary turbine assembly, the first hook portion, being positioned in the longitudinally outward-facing first open slot of the shroud-block circumferential segment, permits a surrounding compliant member to be used in the first open slot to allow for some relative thermal deformation of the ceramic inner shroud and the shroud-block circumferential segment while preventing substantial mechanical loading of the ceramic inner shroud.

DETAILED DESCRIPTION OF THE INVENTION

Figure 1:
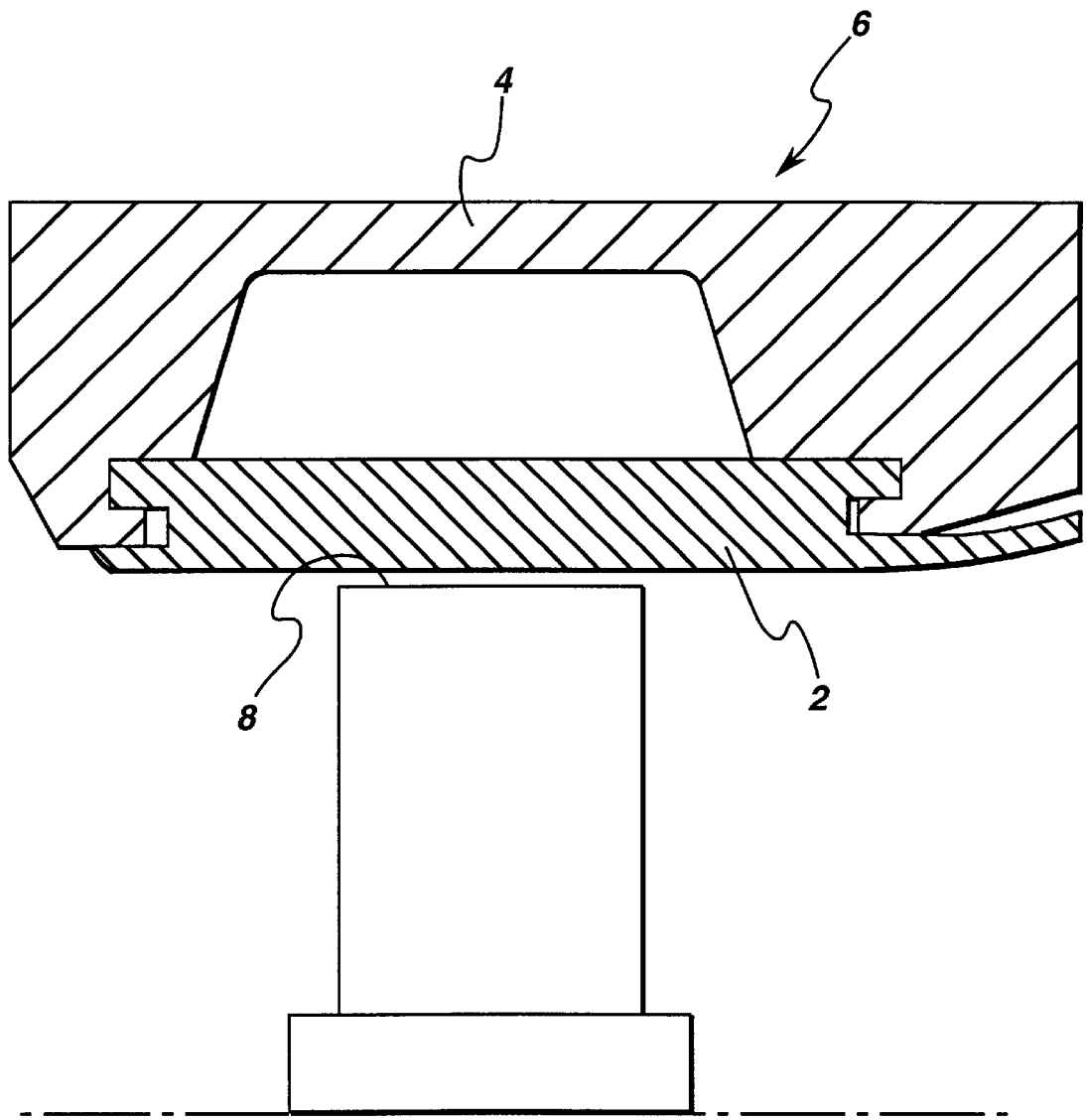
FIG. 1 is a cross-sectional view of a prior-art turbine assembly including a prior-art inner shroud, such cross-sectional view taken by a cutting plane wherein the longitudinal axis of the stator of the turbine assembly lies in the cutting plane.
Figure 2:
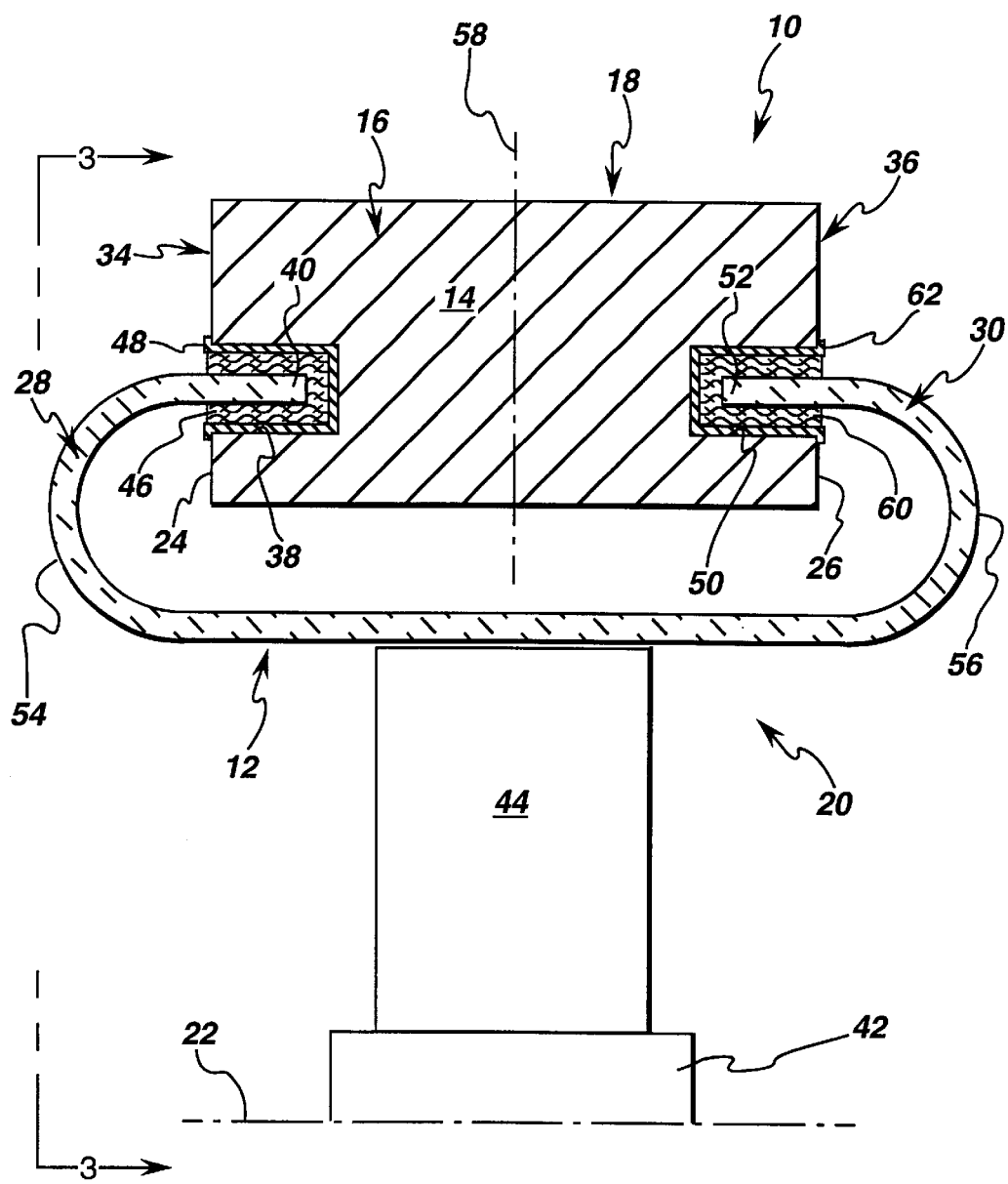
FIG. 2 is a view, as in FIG. 1, but of an exemplary turbine assembly, including an exemplary inner shroud, of the present invention.
Figure 3:
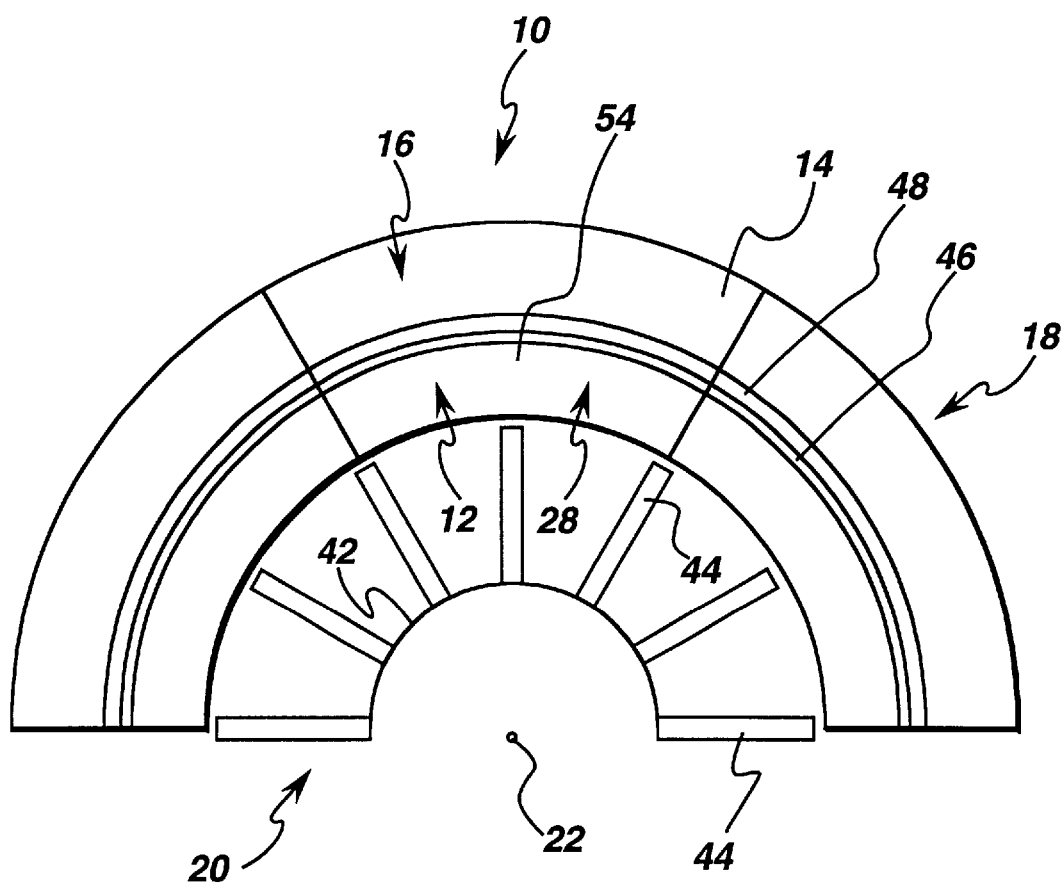
FIG. 3 is a view of the exemplary turbine assembly, including the exemplary inner shroud, of FIG. 2 taken along lines 3—3 of FIG. 2.

Referring now to FIGS. 2 and 3 of the drawings, wherein like numerals represent like elements throughout, there is shown an exemplary turbine assembly 10, including an exemplary inner shroud 12, of the present invention.

Broadly described, the exemplary inner shroud 12 of the present invention is attachable to a circumferential segment 14 of an outer shroud block 16 of a stator 18 of a turbine 20. The stator 18 has a longitudinal axis 22. The circumferential segment 14 of the outer shroud block 16 has longitudinally spaced apart, generally opposing, and generally longitudinally outward facing first and second side portions 24 and 26. The inner shroud 12 comprises a ceramic material. The inner shroud 12 has spaced apart, generally opposing, and generally inward facing first and second hook portions 28 and 30. When the inner shroud 12 is attached to the circumferential segment 14 of the outer shroud block 16, the first hook portion 28 of the inner shroud 12 longitudinally and radially surrounds the first side portion 24 of the outer shroud block 16, and the second hook portion 30 of the inner shroud 12 longitudinally and radially surrounds the second side portion 26 of the outer shroud block 16.

The term "turbine", as used to describe an exemplary embodiment of the present invention, includes, without limitation, turbine sections of steam turbines and compressor and/or turbine sections of gas turbines. As used herein, a "circumferential segment" includes a complete inner shroud or a circumferential portion thereof. As shown in FIGS. 2 and 3, it is desired, but not required, that the first and second side portions 24 and 26 be disposed an equal first radial distance from the longitudinal axis 22 of the stator 18 and extend an equal second radial distance in a radially-outward direction. For unequally radially-disposed and/or unequally radially-extending first and second side portions 24 and 26, the first and second hook portions 28 and 30 would be unequally shaped and adapted to longitudinally and radially surround their respective first and second side portions 24 and 26. The shape of the outer shroud block 16 above the first and second side portions 24 and 26 is arbitrary except for allowing the first and second hook portions 28 and 30 to longitudinally and radially surround their respective first and second side portions 24 and 26. The first and second side portions 24 and 26 need not be perpendicular to the longitudinal axis 22. By "generally longitudinally outward facing" is meant that the first and second side portions 24 and 26 are not generally radially or longitudinally inward facing. By "generally inward facing" is meant that the first and second hook portions 28 and 30 generally face longitudinally toward each other when the inner shroud 12 is attached to the circumferential segment 14 of the outer shroud block 16. The first and second hook portions 28 and 30 shown in FIG. 2 would still be considered to be generally inward facing even if they were of unequal radial distances from the longitudinal axis 22.

In one example, the circumferential segment 14 of the outer shroud block 16 consists essentially of metal, and the ceramic material consists essentially of a ceramic matrix composite. The term "metal" includes an alloy. The phrase "ceramic matrix composite" is defined to be a material having any (metal or non-metal) fiber filament embedded in any ceramic matrix binder. An example of a ceramic matrix composite is a silicon carbide based, silicon melt infiltrated, ceramic composite wherein the fiber filament is a continuous silicon-carbide fiber.

Broadly described, the exemplary turbine assembly 10 of the present invention includes a turbine stator 18 and a ceramic inner shroud 12. A ceramic inner shroud 12 is defined to be an inner shroud comprising a ceramic material. The stator 18 has a longitudinal axis 22 and an outer shroud block 16. The outer shroud block 16 has a circumferential segment 14. The circumferential segment 14 has longitudinally spaced apart, generally opposing, and generally longitudinally outward facing first and second sides 34 and 36. The first side 34 has a generally longitudinally outward facing first open slot 38. The ceramic inner shroud 12 includes a first hook portion 28 having a first end 40 disposed in the first open slot 38.

As shown in FIGS. 2 and 3, a turbine 20 typically includes, without limitation, the turbine assembly 10, a rotatable shaft 42, and a circumferential row of rotor blades 44 attached to the rotatable shaft 42.

In one example, the turbine assembly 10 also includes means for resiliently cushioning the first end 40 of the first hook portion 28 of the ceramic inner shroud 12 in the first open slot 38 of the first side 34 of the circumferential segment 14 of the outer shroud block 16. The resilient cushioning means includes a first compliant member 46, such as an elastomer, a woven metal mesh, a spring or springs, and the like, disposed within the first open slot 38. In one construction, the circumferential segment 14 of the outer shroud block 16 consists essentially of metal, and the ceramic inner shroud 12 consists essentially of a ceramic matrix composite.

The above example is otherwise described as follows. The turbine assembly 10 also includes a first compliant member 46, shown in FIG. 2 as, but not limited to, a woven metal mesh. The first compliant member 46 is disposed in the first open slot 38 and surrounds the first end 40 of the first hook portion 28 of the ceramic inner shroud 12. As used herein, the term "surrounds" or "surrounding" means generally surrounds or generally surrounding. Optionally, the turbine assembly 10 further includes a first metal clip 48 (such as a sheet-metal clip) disposed in the first open slot 38 and surrounding the first compliant member 46. In one construction, the circumferential segment 14 of the outer shroud block 16 consists essentially of metal, and the ceramic inner shroud 12 consists essentially of a ceramic matrix composite.

In an exemplary embodiment, the turbine assembly 10 includes a turbine stator 18 and a ceramic inner shroud 12. A ceramic inner shroud 12 is defined to be an inner shroud comprising a ceramic material. The stator 18 has a longitudinal axis 22 and an outer shroud block 16. The outer shroud block 16 has a circumferential segment 14. The circumferential segment 14 has longitudinally spaced apart, generally opposing, and generally longitudinally outward facing first and second sides 34 and 36. The first side 34 has a generally longitudinally outward facing first open slot 38, and the second side 36 has a generally longitudinally outward facing second open slot 50. The ceramic inner shroud 12 includes a first hook portion 28 having a first end 40 disposed in the first open slot 38 and includes a second hook portion 30 having a second end 52 disposed in the second open slot 50. The first hook portion 28 has a first curved region 54, and the second hook portion 30 has a second curved region 56. The first and second curved regions 54 and 56 have longitudinally-outermost points which are longitudinally spaced apart a first longitudinal distance, and the ceramic inner shroud 12 has a longitudinal length equal to the first longitudinal distance. Thus, the first and second hook portions 28 and 30 define the longitudinal ends of the ceramic inner shroud 12.

Here, the second open slot 50 is a general mirror image of the first open slot 38 about a plane (shown on edge as 58 in FIG. 2) which is disposed equidistant the first and second curved regions 54 and 56 and which is oriented perpendicular to the longitudinal axis 22. Likewise, the second curved region 56 is a general mirror image of the first curved region 54 about the plane 58, and the second end 52 is a general mirror image of the first end 40 about the plane 58. Outside the first and second open slots 38 and 50, the ceramic inner shroud 12 is spaced apart from the circumferential segment 14 of the outer shroud block 16. It is noted that the previously-described first side portion 24 is that portion of the first side 34 below (i.e., radially inward of) the first open slot 38, and that the previously-described second side portion 26 is that portion of the second side 36 below (i.e., radially inward of) the second open slot 50.

Continuing with the description of this exemplary embodiment, the turbine assembly 10 also includes a first compliant member 46 disposed in the first open slot 38 and surrounding the first end 40 of the first hook portion 28 of the ceramic inner shroud 12. Likewise, the turbine assembly 10 further includes a second compliant member 60 disposed in the second open slot 50 and surrounding the second end 52 of the second hook portion 30 of the ceramic inner shroud 12. Here, the turbine assembly 10 further includes a first metal clip 48 disposed in the first open slot 38 and surrounding the first compliant member 46 and additionally includes a second metal clip 62 disposed in the second open slot 50 and surrounding the second compliant member 60. In one construction, the circumferential segment 14 of the outer shroud block 16 consists essentially of metal, and the ceramic inner shroud 12 consists essentially of a ceramic matrix composite.

Several benefits and advantages are derived from the invention. The ceramic inner shroud 12 is heat resistant. The inward-facing first and second hook portions 28 and 30 of the ceramic inner shroud 12 are easy to manufacture and provide continuous reinforcing fibers from the hook region to the hot gas path face which is desirable to maintain structural integrity and dimensional stability of the ceramic inner shroud 12. In the turbine assembly 10, the first hook portion 28 being positioned in the longitudinally outward-facing first open slot 38 of the shroud-block circumferential segment 14 permits a surrounding first compliant member 46 to be used in the first open slot 38 to allow for some relative thermal deformation of the ceramic inner shroud 12 and the shroud-block circumferential segment 14 while preventing substantial mechanical loading of the ceramic inner shroud 12.

The foregoing description of several preferred embodiments of the invention has been presented for purposes of illustration. It is not intended to be exhaustive or to limit the invention to the precise form disclosed, and obviously many modifications and variations are possible in light of the above teaching. It is intended that the scope of the invention be defined by the claims appended hereto.

What is claimed is:

1. A turbine assembly comprising:

a) a turbine stator having a longitudinal axis and an outer shroud block, wherein said outer shroud block has a circumferential segment, wherein said circumferential segment has longitudinally spaced apart, generally opposing, and generally longitudinally outward facing first and second sides, and wherein said first side has a generally longitudinally outward facing first open slot;

b) a ceramic inner shroud including a first hook portion having a first end disposed in said first open slot;

c) a first compliant member disposed in said first open slot and surrounding said first end of said first hook portion of said ceramic inner shroud; and d) a first metal clip disposed in said first open slot and surrounding said first compliant member.

2. The turbine assembly of claim 1, wherein said circumferential segment of said outer shroud block consists essentially of metal and wherein said ceramic inner shroud consists essentially of a ceramic matrix composite.

3. A turbine assembly comprising:

a) a turbine stator having a longitudinal axis and an outer shroud block, wherein said outer shroud block has a circumferential segment, wherein said circumferential segment has longitudinally spaced apart, generally opposing, and generally longitudinally outward facing first and second sides, wherein said first side has a generally longitudinally outward facing first open slot, and wherein said second side has a generally longitudinally outward facing second open slot;

b) a ceramic inner shroud including a first hook portion having a first end disposed in said first open slot and including a second hook portion having a second end disposed in said second open slot; and c) said first hook portion having a first curved region, said second hook portion having a second curved region, said first and second curved regions having longitudinally-outermost points which are longitudinally spaced apart a first longitudinal distance, and said ceramic inner shroud having a longitudinal length equal to said first longitudinal distance.

4. The turbine assembly of claim 3, also including a first compliant member disposed in said first open slot and surrounding said first end of said first hook portion of said ceramic inner shroud, and further including a second compliant member disposed in said second open slot and surrounding said second end of said second hook portion of said ceramic inner shroud.

5. The turbine assembly of claim 4, also including a first metal clip disposed in said first open slot and surrounding said first compliant member, and further including a second metal clip disposed in said second open slot and surrounding said second compliant member.

6. The turbine assembly of claim 5, wherein said circumferential segment of said outer shroud block consists essentially of metal and wherein said ceramic inner shroud consists essentially of a ceramic matrix composite.

7. The turbine assembly of claim 3, wherein said second open slot is a general mirror image of said first open slot, said second curved region is a general mirror image of said first curved region, and said second end is a general mirror image of said first end.

8. The turbine assembly of claim 3, wherein, outside said first and second open slots, said ceramic inner shroud is spaced apart from said circumferential segment of said outer shroud block.

* * * * *